United States Patent
Schwenkel et al.

(10) Patent No.: US 8,306,680 B2
(45) Date of Patent: Nov. 6, 2012

(54) ARRANGEMENT AND METHOD FOR CONTROLLING AN AUTOMATED SYSTEM, IN PARTICULAR A RAILWAY SYSTEM

(75) Inventors: Hans Schwenkel, Stuttgart (DE); Christoph Weishaar, Waiblingen-Bittenfeld (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/347,129

(22) Filed: Jan. 10, 2012

(65) Prior Publication Data
US 2012/0173054 A1 Jul. 5, 2012

Related U.S. Application Data

(63) Continuation of application No. PCT/EP2010/059862, filed on Jul. 9, 2010.

(30) Foreign Application Priority Data

Jul. 10, 2009 (DE) .......................... 10 2009 033 529

(51) Int. Cl.
G05B 19/05 (2006.01)
G05B 9/02 (2006.01)
B61L 7/06 (2006.01)
(52) U.S. Cl. .......................................... 701/19; 714/43
(58) Field of Classification Search ................... None
See application file for complete search history.

(56) References Cited

U.S. PATENT DOCUMENTS

| | | | |
|---|---|---|---|
| 5,119,739 | A | 6/1992 | Templeton et al. |
| 6,915,444 | B2 * | 7/2005 | Vasko et al. ............... 714/4.4 |
| 7,370,239 | B2 * | 5/2008 | Apel et al. ................. 714/43 |
| 7,698,600 | B2 | 4/2010 | Araki et al. |

(Continued)

FOREIGN PATENT DOCUMENTS
DE 197 42 716 A1 4/1999
(Continued)

OTHER PUBLICATIONS

CEI IEC 61508-2; Functional safety of electrical/electronic/programmable electronic safety-related systems—Part 2: Requirements for electrical/electronic/programmable electronic safety-related systems; May 2000; 151 pages.

(Continued)

*Primary Examiner* — Michael J. Zanelli
(74) *Attorney, Agent, or Firm* — Harness, Dickey & Pierce, P.L.C.

(57) ABSTRACT

An arrangement for controlling an automated system, having a number of sensors and actuators, in particular for controlling a railroad system. A programmable control unit runs a user program to process input data from the sensors and to generate control commands for the actuators. The sensors and the actuators are connected to a remote I/O unit, which is connected to the control unit via a communication network. The control unit and the I/O unit interchange data messages in order to transmit the input data and the control commands. The arrangement has a remote disconnection unit, which is coupled to the remote I/O unit independently from the input data and control commands. The control unit is designed to integrate specific verification data for the disconnection unit into the data messages for the I/O unit. The disconnection unit is designed to deactivate the I/O unit depending on the specific verification data.

16 Claims, 3 Drawing Sheets

U.S. PATENT DOCUMENTS

2005/0249112 A1* 11/2005 Barthel et al. ............... 370/216
2006/0242535 A1* 10/2006 Barthel et al. ............... 714/758
2007/0255429 A1* 11/2007 Hauf .............................. 700/19

FOREIGN PATENT DOCUMENTS

| DE | 199 39 567 A1 | 3/2001 |
| DE | 10 2007 039 154 A1 | 2/2009 |
| WO | WO 2006/011578 A1 | 2/2006 |

OTHER PUBLICATIONS

IEC 61131-1; Programmable Controllers—Part 1: General information; May 2003; 23 pages.

ISA/EP; English language translation of International Preliminary Report on Patentability (Chapter 1); issued by WIPO Jan. 17, 2012; 13 pages.

\* cited by examiner

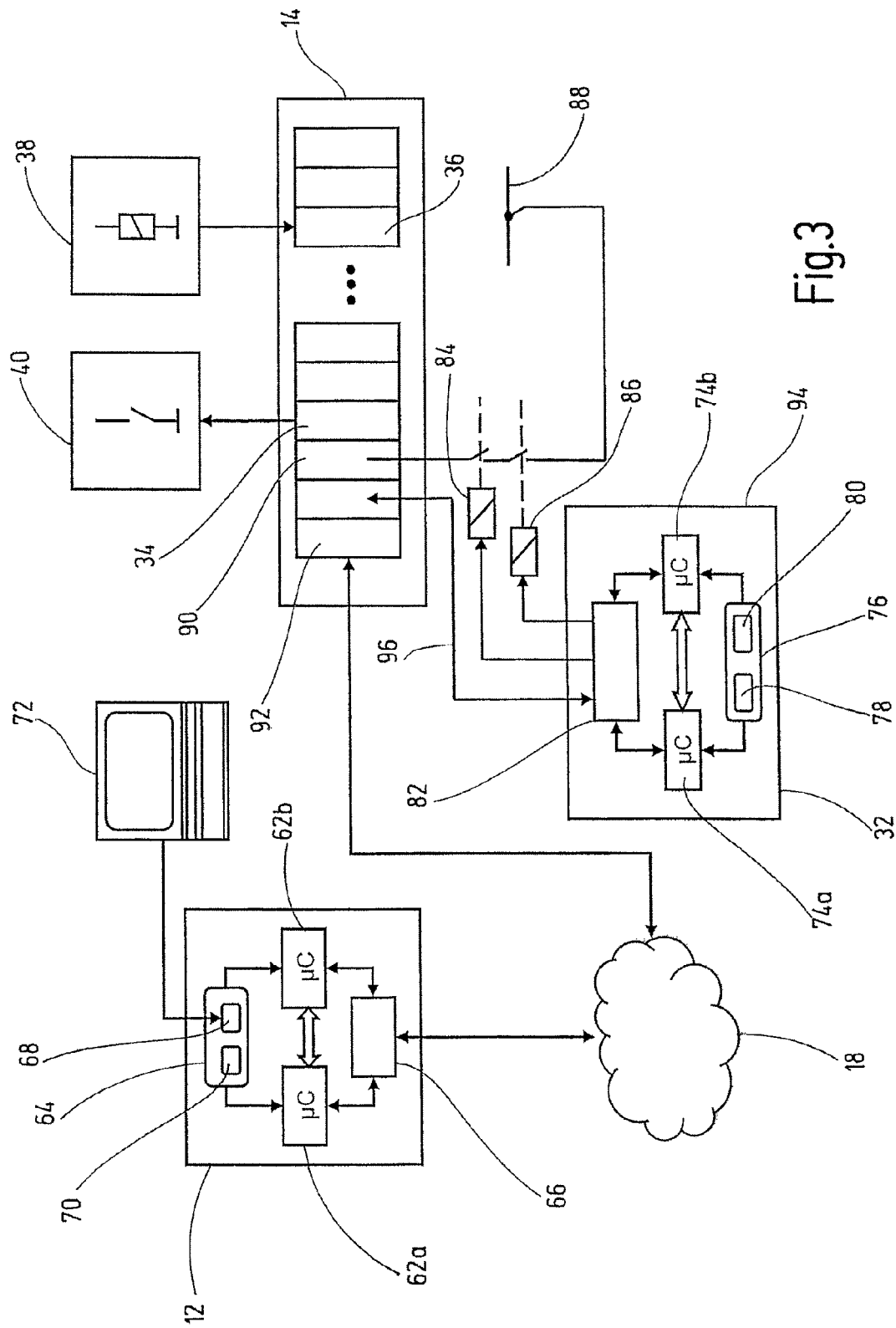

ARRANGEMENT AND METHOD FOR CONTROLLING AN AUTOMATED SYSTEM, IN PARTICULAR A RAILWAY SYSTEM

CROSS-REFERENCES TO RELATED APPLICATIONS

This application is a continuation of international patent application PCT/EP2010/059862 filed on Jul. 9, 2010 designating the U.S., which international patent application has been published in German language and claims priority from German patent application DE 10 2009 033 529.3 filed on Jul. 10, 2009. The entire contents of these priority applications are incorporated herein by reference.

BACKGROUND OF THE INVENTION

The present invention relates to an arrangement and a method for controlling an automated system and, in particular, to an arrangement and a method for controlling a railroad system. Moreover, the invention relates to a new disconnection unit for use in such an arrangement and such a method.

DE 10 2007 039 154 A1 discloses a safety system for a railroad network having a control level and having field elements to be controlled. An electronic railway control center is mentioned as one example. The document states that such control centers historically are constructed on a highly centralized basis, and any minor change therefore affected the entire system. This also applied to the software, which, in the event of minor changes, had to be adapted from the control level down to the field elements, such as switches, movement signals etc. In order to simplify the conversion and extension of such a safety system, the document proposes a modular design, with the control level being in the form of the master, with the field elements being in the form of slaves, and with the master and the slaves being connected to one another via a communication system. The slaves are also intended to be controllable via an additional controller, which can be connected to the communication system via a communication interface that is the same for all the slaves.

For the proposed implementation, DE 10 2007 039 154 A1 requires that the communication system ensures uncorrupted and uncorruptable transmission of data messages between the master and the slaves. In other words, the proposed solution requires a failsafe communication system between the master and the slaves. This means that both the master and the slaves must have a specific communication interface for a failsafe communication system. An implementation of this kind may result in progress in terms of flexibility for conversions or extensions in comparison to earlier safety systems, on which DE 10 2007 039 154 A1 is based. However, the proposed implementation is disadvantageous when existing railroad systems have to be converted, since this implementation is based on the use of a very specific communication system, which is therefore generally proprietary.

DE 197 42 716 A1 describes a control and data transmission system having a control unit and a plurality of I/O units. Safety-related assemblies are in each case integrated in the control unit and the I/O units, which assemblies negate the input and output data to be transmitted and transmit such data redundantly with respect to the original data. The redundant data transmission requires a communication interface, which is specifically designed for this purpose and is therefore proprietary, and it requires correspondingly designed I/O units. This control and data transmission system is therefore also disadvantageous when it comes to convert existing railroad systems.

SUMMARY OF THE INVENTION

Against this background, it is an object of the present invention to provide an arrangement and a method which allow flexible changing or extension of an automated system with safety-relevant components, in particular of a railroad system, in a cost-effective manner.

According to one aspect of the invention, there is provided an arrangement for controlling a railroad system which has sensors and actuators, the arrangement comprising a programmable control unit for running a user program; comprising a remote I/O unit to which a number of the sensors and actuators are connected; comprising a communication network which connects the control unit and the remote I/O unit, and comprising a remote disconnection unit coupled to the remote I/O unit as a separate entity, wherein the control unit is designed to process input data from the sensors using the user program in order to generate control commands for the actuators, wherein the control unit and the remote I/O unit are designed to interchange data messages via the communication network in order to transmit the input data and the control commands, wherein the control unit is further designed to integrate specific verification data for the disconnection unit into the data messages for the I/O unit, said verification data being independent from the input data and control commands, and wherein the disconnection unit is designed to deactivate the I/O unit depending on the specific verification data.

According to another aspect, there is provided a disconnection unit for use in an arrangement for controlling an automated system having a programmable control unit for running a user program, having a remote I/O unit to which a number of sensors and actuators are connected, and having a communication network which connects the control unit and the remote I/O unit in order to transmit data messages comprising control commands from the control unit to the I/O unit, said I/O unit driving said actuators in response to the control commands, the disconnection unit comprising a data interface for receiving specific verification data from the control unit, said specific verification data being integrated into said data messages; comprising a data processing part for processing said specific verification data separately from the input data and the control commands, and comprising a disconnection part designed to prevent the I/O unit from driving the actuators as a function of the specific verification data.

According to yet another aspect, there is provided a method for controlling an automated system which has sensors and actuators, the method comprising the steps of providing a remote I/O unit, to which a number of the sensors and actuators are connected; providing a control unit for processing input data from the sensors and for generating control commands for the actuators in response to the input data; providing a communication network which connects the control unit and the remote I/O unit; interchanging data messages between the control unit and the I/O unit via the communication network, with the data messages comprising at least one of the input data and the control commands; and providing a remote disconnection unit in the area of the I/O unit and coupling the remote disconnection unit to the remote I/O unit, wherein the control unit integrates specific verification data for the disconnection unit into the data messages for the I/O unit, and wherein the disconnection unit processes the specific verification data separately from the input data and the control commands and deactivates the I/O unit as a function of the specific verification data.

The novel arrangement and the novel method use a new remote disconnection unit, which is added to the arrangement and which is coupled to the remote I/O unit. The disconnection unit is not included in the general processing and transmission of the input data and control commands, which means it is separate from the input data and control commands. The disconnection unit is advantageously positioned in the vicinity of the remote I/O unit. The disconnection unit receives specific verification data via a data message that is addressed to the I/O unit, with the verification data being embedded in the data messages from the (preferably central) control unit. The disconnection unit can therefore use the verification data to check whether the coupled I/O unit has received a data message that was actually directed to the coupled I/O unit by the control unit.

In preferred exemplary embodiments, the remote disconnection unit is not directly connected to the communication network, i.e. the remote disconnection unit does not have its own interface for connection to the communication network. In this case, the remote disconnection unit receives the verification data exclusively via the remote I/O unit. However, in principle, it is feasible for the remote disconnection unit to have a communication interface for direct connection to the communication network in order to receive the data messages and/or in order to allow direct communication between the control unit and the remote disconnection unit, for example for remote maintenance of the remote disconnection unit from any desired access point to the communication network.

Regardless of such an optionally additional connection of the disconnection unit to the communication network, however, the disconnection unit is primarily designed to process verification data that is integrated into the data messages sent to the I/O unit. The disconnection unit receives this verification data only when the corresponding data message has actually reached the coupled I/O unit. In consequence, the disconnection unit can monitor whether the coupled I/O unit has received a data message addressed to it. Only if the disconnection unit receives correct verification data, it allows operation of the I/O unit. If the verification data is missing or the verification data does not correspond to an expectation in the disconnection unit, the disconnection unit deactivates the coupled I/O unit. The disconnection unit therefore prevents access to the remote I/O unit from the control unit, depending on the verification data.

The verification data are independent from the input data and control commands, and they are specifically directed to the disconnection unit. The I/O unit does not require the verification data in order to interpret a control command. Accordingly, the verification data is not evaluated by the I/O unit in the preferred exemplary embodiments. Rather, the I/O unit passes the verification data on to the disconnection unit in the preferred exemplary embodiments "unread", i.e. without any interpretation of the data. Conversely, in the preferred exemplary embodiments, the input data and control commands are processed and evaluated without the disconnection unit, i.e. the disconnection unit is not included in the processing and evaluation of the input data and control commands. The functions of the disconnection unit and I/O unit are therefore clearly separated, and are independent of one another.

However, the disconnection unit uses its specific verification data to monitor that the coupled I/O unit is carrying out only control commands that are actually intended for the coupled I/O unit. This monitoring is the major purpose of the coupling. The disconnection unit is therefore coupled to the I/O unit separately from the input data and control commands, and the input data and control commands completely bypass the disconnection unit in the preferred exemplary embodiments.

On its own, the novel disconnection unit cannot ensure that the I/O unit is operating correctly and carries out the control commands provided by the control unit in each case at the correct time. However, the disconnection unit can ensure that the I/O unit does not carry out incorrectly received control commands, such as control commands which were addressed to a different I/O unit and which were erroneously received because of an error in the address field of the data message, for instance. The disconnection unit therefore ensures that errors are precluded which would otherwise have to be precluded by use of a failsafe communication network. In other words, the novel disconnection unit makes it possible to use a standard communication network which, by itself, does not ensure error-free transmission of data messages.

The novel arrangement and the novel method therefore have the advantage that they can be implemented without a proprietary, failsafe communication network. Preferably, the novel arrangement and the novel method thus comprise a communication network that, by itself, does not provide failsafety within the meaning of SIL 2 of International Standard IEC 61508, Category 3 of European Standard EN 954 or similar safety standards. In consequence, the remote I/O unit can be designed with a standard interface for connection to any desired non-failsafe communication network. The I/O unit advantageously has a single channel design, and it thus processes the input data and control commands with one channel only. The novel arrangement and the novel method can therefore be implemented more cost-effectively than the arrangement and the method from the prior art. The above object is completely achieved.

In a preferred refinement, the I/O unit is designed to acknowledge every data message that is received from the control unit and comprises a control command for the I/O unit, by means of a response message which signals actual execution of the control command. The response message preferably comprises further verification data provided by the disconnection unit in order to allow the control unit to redundantly check the true origin of the response message.

In this refinement, the control unit receives an execution confirmation from the I/O unit for each data message sent to just that I/O unit, such that the control unit can monitor, regardless of the communication network used, whether the I/O unit has actually executed the control command. On the basis of the further verification data from the disconnection unit, which is integrated in the response message, the control unit can additionally monitor that the response message originates from the "correct" I/O unit and not, for example, from another I/O unit connected to the same communication network. The refinement therefore has a further error identification mechanism, which uses the novel disconnection unit.

In a further refinement, the I/O unit has a network interface for connection to the communication network and a local data interface, to which the disconnection unit is connected in order to receive the verification data. In particularly preferred refinements, the local data interface is a serial standard interface, such as what is known as an RS 485 interface, an RS 422 or an RS 232 interface.

This refinement allows very simple and cost-effective coupling of the remote disconnection unit and the I/O unit. All the data messages from the communication network, which are addressed to the I/O unit, first have to pass through the network interface. The data contained in the data message is split, and in particular the verification data is passed on to the disconnection unit only after the data has passed the network interface. As an alternative to this, the disconnection unit could in other refinements monitor the data messages at the network interface, although this is not possible without problems in all communication networks and network interfaces.

In a further refinement, the I/O unit has a number of terminals for connecting the actuators, with the disconnection unit being designed to deactivate the terminals depending on the verification data. In one particularly preferred variant of this refinement, the disconnection unit is designed to switch the I/O unit at least partially inactive in order to suppress the output of signals from the terminals to the actuators. In a further variant, the disconnection unit is also designed to deactivate the terminals for connection of the sensors, and in particular to switch them to be inactive, in order to prevent a response message, which could appear authentic and/or which might be expected by the control unit, to be generated and transmitted from the I/O unit.

These refinements allow reliable deactivation of the I/O unit in a very simple and cost-effective manner, with the consequence that the normal control process is immediately interrupted when an unsafe state occurs in the communication.

In a further refinement, the disconnection unit is arranged separately from the I/O unit.

In this refinement, the disconnection unit has its own device housing, which is arranged separately from the I/O unit. However, the disconnection unit and the I/O unit may nevertheless be arranged in a common switching cabinet or the like in accordance this refinement. In any case, the disconnection unit is a separate device in this refinement, and it may be coupled to the I/O unit via a cable, such as a serial data cable, with both the housing of the disconnection unit and the housing of the I/O unit having an appropriate plug and an appropriate socket. The refinement allows a very cost-effective and universal implementation, since the disconnection unit can be connected very easily to virtually any kind of I/O units. The novel arrangement and the novel method are therefore largely independent of manufacturer and system, not only with respect to the communication network but also with respect to the remote I/O unit.

In a further refinement, the disconnection unit has a multichannel design in order to redundantly process the verification data.

This refinement allows a higher level of failsafety in the processing of the verification data. Consequently, an unsafe control operation resulting from an incorrectly received data message is precluded even more reliably. On the other hand, this refinement has the major advantage that the multi-channel data processing can be concentrated in the novel disconnection unit, thus simplifying the use of cost-effective, non-failsafe I/O units.

In a further refinement, the verification data comprises a—preferably worldwide—unique address, which uniquely identifies the disconnection unit.

The preferred worldwide unique address may, for example, be implemented by the address comprising individual unique manufacturer identification as well as a device identification number that is uniquely allocated by the manufacturer. Since the disconnection unit does not require direct connection to the communication network and, to this extent, is independent of the communication protocol, which is used in the communication network, the manufacturer can choose the unique address freely and, for example, can use cryptographic methods to protect it against copying and use in any other way. The address of the disconnection unit is preferably used here in addition to a further address that identifies the I/O unit within the communication protocol. The address of the I/O unit is typically contained in the protocol part of the data message while, in contrast, the address of the disconnection unit is transmitted in the payload data part. The separate addressing of the disconnection unit independently and in addition to the address of the I/O unit allows simple and very reliable checking of whether a data message from the control unit has reached the "correct" I/O unit. The refinement therefore allows a particularly high level of failsafety with respect to address corruptions.

In a further refinement, the control unit is designed for transmitting a plurality of data messages at defined time intervals to the I/O unit, with the disconnection unit being designed to monitor the time intervals and to deactivate the I/O unit as a function thereof. The disconnection unit is preferably designed to deactivate the I/O unit when the control unit does not send appropriate data messages to the I/O unit over a relatively long time period. By way of example, the relatively long time period can be determined from the fact that no data messages have been received within a predefined number of time intervals.

In this refinement, the disconnection unit does not just carry out the task of ensuring the correct addressee at the communication network. In addition, the disconnection unit monitors the correct reception of data messages, at the correct time. In the preferred variants of this refinement, this monitoring is also carried out in a failsafe manner, which can be achieved by a multichannel design of the disconnection unit. The refinement has the advantage that the I/O unit is automatically deactivated when the communication link to the control unit is broken or temporarily interrupted. In consequence, this refinement allows less stringent requirements for the availability of the communication network. For example, this refinement makes it easier to use the Internet as the communication network. On the other hand, this refinement ensures that the I/O unit cannot make any change to the actuators during time periods "without control", in which there is no communication with the control unit, and thus cannot change the system state without this being "noticed" by the control unit. Furthermore, this refinement has the advantage that the control unit can deactivate the I/O unit by the control unit interrupting the transmission of data messages to the I/O unit for a time period that is greater than the number of predefined time intervals. For this situation, the control unit may be designed to suspend transmission of data messages for said time period.

In a further refinement, the verification data comprises a serial number, which represents a predefined sequence of the data messages.

In this refinement, the disconnection unit is able to reliably identify the failure or the absence of a data message. The refinement contributes to ensuring that a received data message is up to date, since a data message that has "become stuck" in the communication network can be identified as such if it is received at a later time at the I/O unit. Confusion with a more recent data message can be precluded by the serial number. The failsafety of the novel arrangement and of the novel method is further enhanced.

In a further refinement, the verification data comprises a checksum that essentially makes safe the specific verification data alone.

The use of checksums, in particular in the form of a so-called CRC (Cyclic Redundancy Checksum) is known per se in conjunction with the transmission of data messages via a communication network. The present refinement uses a checksum that, in practice, verifies only the verification data itself. In other words, this checksum is independent, or at least largely independent, of other data contents in the data message. The refinement has the advantage that the disconnection unit can calculate and check the checksum autonomously on the basis of the verification data that is passed on. Alternatively, in principle, it would be feasible to use a checksum calculated over the entire data message. However, this alternative has the disadvantage that the disconnection unit must know all of the data contents of the data message in order to locally check the checksum. The preferred refinement with a specific checksum that relates only to that part of the data message that is of interest to the disconnection unit allows faster and easier monitoring of the data messages.

In a further refinement, the data messages comprise a protocol part and a payload data part, with the protocol part being specified depending on the communication network and with the verification data being arranged in the payload data part.

The payload data part of the data message is largely unspecified with respect to the communication network. It is that part of the data message which is largely freely available to the individual communication subscribers on the network. Restrictions may exist, for example with respect to the length of the payload data part, depending on the network protocol that is used. The content in the payload data part is, however, irrelevant to the operation of the communication network and the transmission of the data messages.

In contrast, the protocol part comprises all the information required for the transmission of data messages in the communication network. This includes, for example, sender and/or address information which identifies the sender and/or addressee of a data message, type information, which specifies the type of data message, length information relating to the length of the data message, and other items.

In this refinement, the verification data is arranged at least essentially (preferably completely) in the payload data part of the data messages. This refinement further contributes to making the novel arrangement and the novel method independent of the communication network used. This refinement therefore allows even more flexible use of existing communication structures.

In a further refinement, the user program has a variable first program part and an invariant second program part, with the first program part determining the control commands depending on the input data, and with the second program part integrating the verification data into the data messages.

In preferred variants of this refinement, the first program part is compatible with International Standard IEC 61131, i.e. the first program part can be created and modified by a user by means of a programming language specified in IEC 61131. In contrast, the second program part is substantially inaccessible by the user. At least the second program part cannot be modified directly using a programming language, which is compatible with IEC 61131. In one particularly preferred variant, the second program part is a part of the operating system or the runtime environment of the control unit. However, it is feasible for the user to be able to configure the second program part within predefined limits, for example in order to enter the worldwide unique address of the disconnection unit.

The refinement has the advantage that the part which is significant for failsafety of the novel arrangement and of the novel method, specifically the integration of the verification data in the data messages, is inaccessible by the user. This more effectively prevents programming errors, which may endanger the failsafety of the apparatus. On the other hand, the user can concentrate on the programming of the logic functions, which are used to produce the control commands for the actuators.

It goes without saying that the features mentioned above and those to be explained in the following text can be used not only in the respectively stated combination but also in other combinations or on their own without departing from the scope of the present invention.

BRIEF DESCRIPTION OF THE DRAWINGS

Exemplary embodiments of the invention will be explained in more detail in the following description and are illustrated in the drawing, in which:

FIG. 3 shows the arrangement from FIG. 1, with further details.

DESCRIPTION OF PREFERRED EMBODIMENTS

Figure 1:
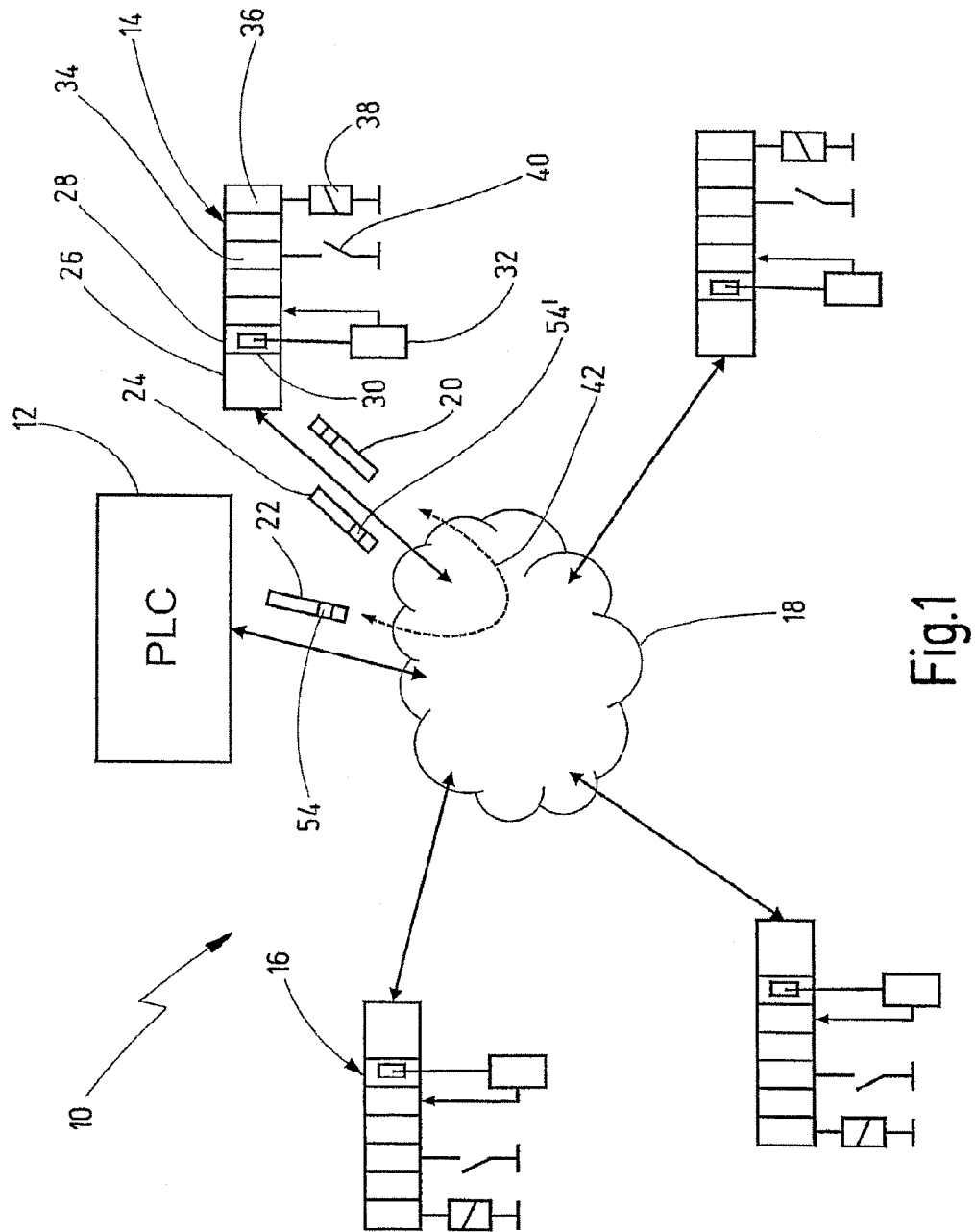
FIG. 1 shows a simplified illustration of an exemplary embodiment of the novel apparatus.

In FIG. 1, an exemplary embodiment of the novel arrangement is designated by reference number 10 in its entirety. In this case, the arrangement 10 is used to control a railroad system, which is a preferred application. In principle, however, the novel arrangement and the novel method may also be used to control other automated systems, in particular systems which carry out safety-relevant control functions.

The arrangement 10 comprises a control unit 12 which, for a railroad system, is generally in the form of a central control unit. However, in principle, it could also be a remote control unit which operates in conjunction with other central and/or remote control units (not illustrated here). In preferred exemplary embodiments, the control unit 12 is a programmable logic controller which can be programmed in one of the programming languages specified in the International Standard IEC 61131. In the preferred exemplary embodiments, the control unit 12 is an intrinsically safe (failsafe) control unit in accordance with SIL 3 of European Standard EN 61508 or a control unit which complies with comparable safety requirements. As described with further details in the following text with reference to FIG. 3, the control unit 12 in the preferred exemplary embodiments is designed to be multi-channel redundant. One such control unit is offered by the applicant under the brand name PSS®, for instance.

The arrangement 10 furthermore has one or more remote I/O units, of which, by way of example, two I/O units are designated with reference numbers 14 and 16 in FIG. 1. The control unit 12 and the I/O units 14, 16 are connected via a communication network 18, and they interchange data messages 20, 22, 24 via the communication network 18. The I/O units are typically arranged at a distance from the control unit 12.

By way of example, the communication network 18 may be a "normal" Ethernet network, a "normal" WLAN network or the Internet. In preferred exemplary embodiments, the communication network 18 is an open communication network which, by itself, does not satisfy the requirements of SIL 3 or comparable requirements for failsafety. In one exemplary embodiment, the communication network 18 is a so-called Profinet network, which is known to the relevant persons skilled in the art in this field.

In this exemplary embodiment, the I/O units 14, 16 are of modular design. They have a head module 26 with a communication interface (see FIG. 3, reference number 92) for connection to the communication network 18. The head module 26 receives the data messages at the communication interface, extracts the payload data and makes it available to the further modules. Furthermore, the head module 26 receives payload data from the further modules in the I/O unit and integrates this data into a data message which is sent as a response message 24 to the control unit 12.

In this case, an interface module 28 with a data interface 30 is connected to the head module 26. In preferred exemplary embodiments, the data interface 30 is a standard interface for serial data transmission, such as an RS 485 interface, an RS 422 interface or an RS 232 interface. A remote disconnection unit 32 is connected to the data interface 30.

In the exemplary embodiment described here, further modules 34, 36, which each provide terminals for connection of sensors and/or actuators, are connected to the interface module 28. In the exemplary embodiment shown in FIG. 1, a relay 38, through which current can be selectively passed via the I/O unit 14, is connected to the module 36. In preferred exemplary embodiments, relay 38 is used for switching a railway point or a movement signal in the railroad system.

In this case, a feedback contact 40, which is positively coupled to the relay 38, is connected to the module 34. In this case, the feedback contact 40 is used as a sensor which can be used to read back the instantaneous switching state of the relay 38.

During operation of the apparatus, the control unit 12 controls the switches and movement signals of the railroad system by means of the remote I/O unit 14, 16. For this purpose, at regular time intervals, the control unit 12 produces a data message 20, 22, which comprises output data representing a control command for the relay 38. Two such data messages 20, 22 are illustrated in FIG. 1. The time interval at which the control unit 12 sends the data messages 20, 22 to the I/O unit 14 is indicated by an arrow 42.

Each addressed I/O unit receives the data messages 20, 22 and controls the connected actuators/relays 32 on the basis of the received output data. In addition, each I/O unit is in this case designed to read back the switching state of a controlled relay 38 by means of the feedback contact 40. The respective switching state is sent back to the control unit 12 as an input data item with a response data message 24. In this way, the control unit 12 receives direct feedback about the instantaneous state of a controlled relay 38. If the switching state read back does not correspond to the ordered switching state, a fault message is generated (not illustrated here) and/or an emergency program is started, which transfers the arrangement 10 to a safe state.

In this case, the illustration in FIG. 1 has been simplified for clarity reasons. In practice, a plurality of relays 38 and/or other actuators and a plurality of sensors are typically used, and the control unit 12 is designed to carry out plausibility checks on the basis of the plurality of the sensor signals. Furthermore, redundant actuators can be provided, in order to transfer the arrangement 10 to a safe state when a fault occurs.

According to an aspect of the invention, the control unit 12 produces not only output and control data for controlling the actuators but, in addition, also verification data, which is transmitted to the I/O unit 14 by the data messages 20, 22. The verification data is transmitted from the I/O unit 14 via data interface 30 to the remote disconnection unit 32. As will be explained in detail with reference to FIGS. 2 and 3 in the following, the disconnection unit 32 uses the verification data to check, in particular, whether the received data message 20, 22 was actually addressed to the receiving I/O unit 14. If this is not the case or some other communication error is identified by the disconnection unit 32 on the basis of the verification data, the disconnection unit 32 deactivates the modules 34, 36 of the I/O unit 14 in order to prevent incorrect control of the actuators 38 in this way and, in addition, to initiate a fault message report to the control unit 12.

In preferred exemplary embodiments, the disconnection unit 32 disconnects the modules 34, 36 from the power supply, as is described further below with reference to FIG. 3.

In order to allow communication with the control unit 12 even in the deactivated state, in preferred exemplary embodiments, the only modules which are deactivated are the modules 34, 36 which are arranged downstream from the head module 26 and the interface module 28.

Figure 2:
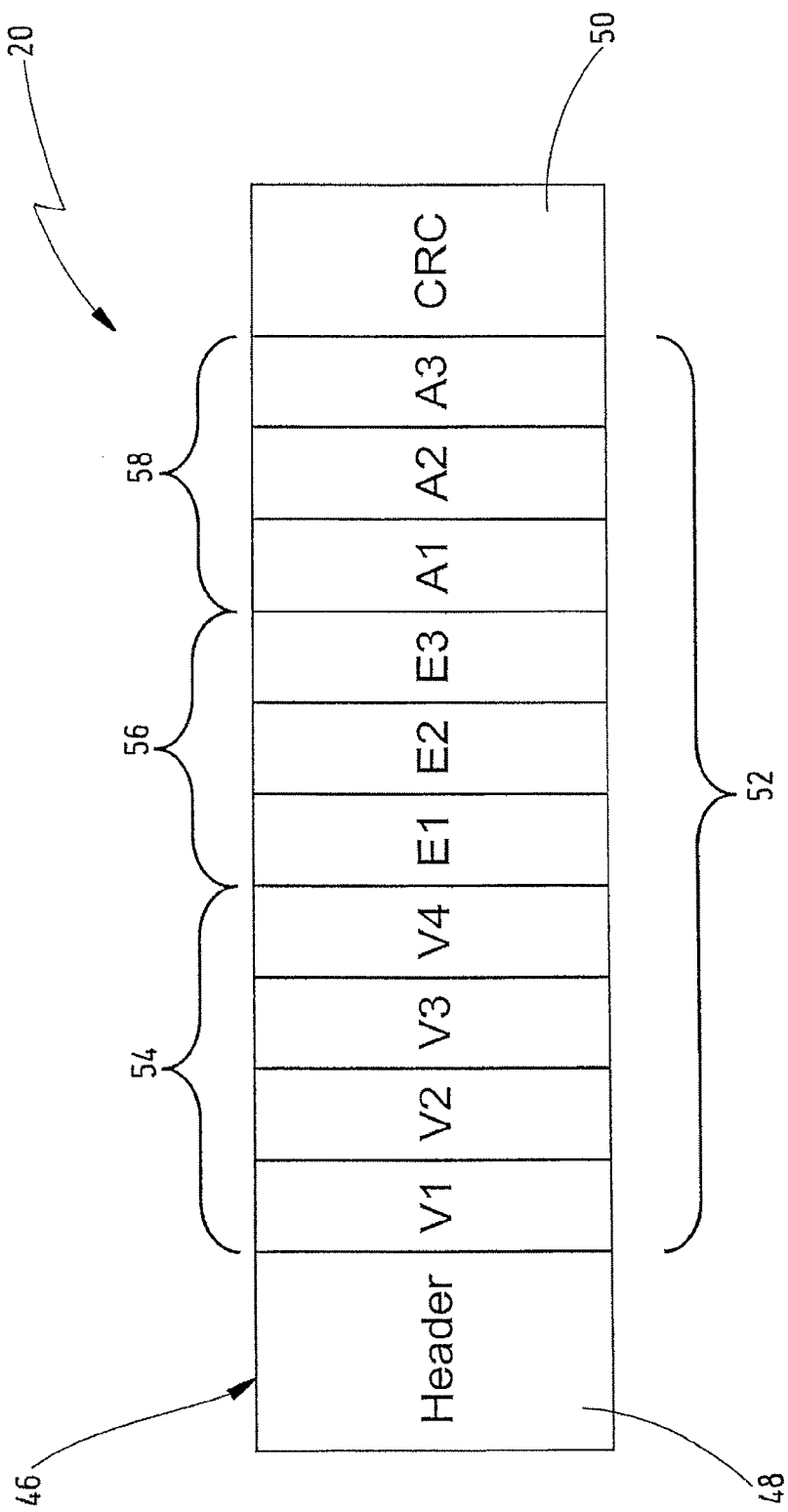
FIG. 2 shows a simplified illustration of a data message which is used for the arrangement from FIG. 1.

FIG. 2 shows an exemplary embodiment of the data message 20 with further details. Just like the further data messages 22, 24, data message 20 has a protocol part 46, which in this case primarily consists of a so-called header 48 at the start of the data message 20 and a checksum 50 at the end of the data message. The header 40 may comprise address information which identifies the sender and/or receiver of the data message, as is known by way of example, from Ethernet data messages. The payload data part 52 is in this case arranged between the header 48 and the checksum 50. According to an aspect of the invention, the payload data part 52 comprises verification data 54 as well as input data 56 and control commands 58. The input data 56 and control commands 58 can be sent alternately in the data message 20, depending on whether the data message is being sent from the control unit 12 to the I/O unit 14, or vice versa. In other words, it is not absolutely essential for the input data 56 and control commands 58 to be contained in the data message at the same time.

The input data 56 represent the actual states of the sensors 40. The output data 58 represent control commands and nominal states for the actuators 38. The verification data 54 is, according to an aspect of the invention, integrated into the data messages 20, 22, 24, thus allowing the disconnection unit 32 and—in preferred exemplary embodiments—the control unit 12 to verify that the data messages have been received by the "correct" I/O unit.

In a preferred exemplary embodiment, the verification data 54 comprises a worldwide unique address, which uniquely identifies the disconnection unit 32. This address is represented by way of example in the verification data item V1 in FIG. 2.

Furthermore, the verification data 54 in this case comprises a serial number, which is shown as V2 in FIG. 2. The serial number V2 is incremented for each data message of a sequence of data messages, in order to be able to verify that a received data message is up to date.

Furthermore, the verification data 54 in this case comprises a time indication which, for example, represents a local transmission time for the data message. The local transmission time is designated V3 in FIG. 2. The time indication allows the receiver to check that a received data message is up to date.

Finally, in the preferred exemplary embodiments, the verification data 54 comprises a checksum V4, which is used in addition to the checksum 50. The checksum V4 essentially characterizes the verification data 54 itself, i.e. it can be calculated essentially on the basis of the verification data 54. However, in principle, it is possible to include further bits in the calculation of the checksum V4, as well as the actual verification data 54, for example in order to allow a longer bit sequence and therefore a higher probability of error identification.

In further exemplary embodiments, the verification data 54 may comprise one or more bits which represent a disconnection command, which causes the disconnection unit to selectively deactivate the I/O unit.

FIG. 2 shows a data message 20 which is sent from the control unit 12 to the I/O unit 14. This comprises the verification data 54 which is passed on from the I/O unit to the disconnection unit. However, the response messages 24 are in principle constructed in the same way. Instead of the verification data 54, they comprise further verification data 54', which has been produced by the disconnection unit 32 and has been transmitted to the I/O unit. In the preferred exemplary embodiments, the further verification data 54' also comprises the worldwide unique address V1, a serial number V2, a time indication V3 and/or a checksum V4. Furthermore, the verification data 54' may comprise one or more bits which represent a system state of the disconnection unit, with the system state containing, in particular, information as to whether the disconnection unit has or has not deactivated the I/O unit.

FIG. 3 shows the arrangement 10 with further details. The same reference symbols denote the same elements as before.

In this case, the control unit 12 has multi-channel redundancy. In some exemplary embodiments, it has a plurality of processors 62a, 62b which operate redundantly with respect to one another and check one another by comparing their processing results with one another. Furthermore, the control unit 12 has a program memory 64 and a network interface 66 for connection to the communication network 18. A user program is stored in the program memory 64, which user program, in the preferred exemplary embodiments, comprises a first program part 68 and a second program part 70. In this case, the first program part 68 is a variable program part, which can be modified by a user by means of a programming tool 72. The user can preferably create the variable program part 68 on the programming tool 72 using a programming language which is compatible with IEC 61131, and can load this into the program memory 64. The programming tool 72 may be a conventional PC on which a suitable program runs for creation of user programs in accordance with IEC 61131.

In the preferred exemplary embodiments, the second program part 70 is an invariant program part which cannot be modified by the user, or at least cannot be modified by the user directly. In these exemplary embodiments, the first, variable program part defines the logic by which the input data from the sensors is processed in order to generate the output data for the actuators. In contrast, the second program part 70 integrates the verification data 54 into the data messages 20, 22, without the user/programmer needing to pay particular attention to the creation of the verification data in its program part 68. The program part 70 may be part of the operating system of the control unit 12. However, it is also possible for the program part 70 to be loaded into the program memory 64 by the user as an encapsulated module. In preferred exemplary embodiments, although the user cannot modify the function of the invariant program part 70, he can configure individual parameters, such as the worldwide unique address V1 of the I/O units 14, 16.

In the preferred exemplary embodiments, the disconnection unit 32 is likewise of multi-channel redundant design, as is illustrated on the basis of two processors 74a, 74b. Furthermore, the disconnection unit 32 has a memory 76 in which, in this case, the worldwide unique address 78 and an operating program (firmware) are stored. The memory 76 is preferably a non-volatile memory, such as an internal EEPROM or an interchangeable fixed memory, such as a smart card, SD card, CF card or the like, which can be detachably inserted into a suitable holder, and can be removed again as required.

Furthermore, the disconnection unit 32 has an interface 82 which in this case comprises the data interface for coupling to the I/O unit 14. Furthermore, the interface 82 comprises two outputs for controlling two relays 84, 86, by means of which the disconnection unit 32 can disconnect the modules 34, 36 from a power supply 88. In an exemplary embodiment, the power for operation of the input modules 34 and output modules 36 is fed into the I/O unit via a specific feed module 90, and the disconnection unit 32 disconnects the feed module 90 from the power supply 88.

Furthermore, the I/O unit 14 has the above-mentioned head module 26 including the network interface, which is designated by reference number 92 in FIG. 3.

Together with the interface 82, the relays 84, 86 form a disconnection part of the disconnection unit 32, by means of which the disconnection unit 32 can at least partially deactivate the I/O unit 14. Instead of relays 84, 86, it is also possible to use other switching elements, such as contactors, transistors and the like. Furthermore, the switching elements 84, 86 can be integrated into the housing 94 of the disconnection unit 32.

In preferred exemplary embodiments, the disconnection unit 32 is an encapsulated "standalone" device, which is arranged with its own device housing 94 separately from the I/O unit 14, and is coupled to the I/O unit via an interface cable 96. In other exemplary embodiments, the disconnection unit 32 may be in the form of a plug-in card without a housing, and/or a module of the I/O unit 14. In some exemplary embodiments, the disconnection unit 32 may have one or more further inputs, in order to connect a failsafe signaling device, such as an emergency-off button. The disconnection unit 32 is in these cases also designed to deactivate the coupled I/O unit 14 depending on operation of the failsafe signaling device.

What is claimed is:

1. An arrangement for controlling a railroad system which has sensors and actuators, the arrangement comprising:
a programmable control unit for running a user program,
a remote I/O unit to which a number of the sensors and actuators are connected,
a communication network which connects the control unit and the remote I/O unit, and
a remote disconnection unit coupled to the remote I/O unit as a separate entity,
wherein the control unit is designed to process input data from the sensors using the user program in order to generate control commands for the actuators,
wherein the control unit and the remote I/O unit are designed to interchange data messages via the communication network in order to transmit the input data and the control commands,
wherein the control unit is further designed to integrate specific verification data for the disconnection unit into the data messages for the I/O unit, said verification data being independent from the input data and control commands, and
wherein the disconnection unit is designed to deactivate the I/O unit depending on the specific verification data.

2. The arrangement of claim 1, wherein the I/O unit is further designed to acknowledge every data message which is received from the control unit and which comprises a control command for the I/O unit, by means of a response message which signals successful execution of the control command.

3. The arrangement of claim 1, wherein the I/O unit has a network interface for connection to the communication network and a local data interface, with the I/O unit further being designed to pass on the specific verification data to the disconnection unit via said local data interface.

4. The arrangement of claim 3, wherein the local data interface is a standard serial interface.

5. The arrangement of claim 3, wherein the I/O unit has a number of terminals for connection of the actuators, with the disconnection unit being designed to deactivate the terminals depending on the verification data.

6. The arrangement of claim 1, wherein the disconnection unit has a multi-channel design in order to redundantly process the verification data.

7. The arrangement of claim 1, wherein the verification data comprise an address that uniquely identifies the disconnection unit.

8. The arrangement of claim 7, wherein the unique address is a worldwide unique address.

9. The arrangement of claim 1, wherein the control unit is designed to transmit a plurality of data messages to the I/O unit at defined time intervals, with the disconnection unit being designed to monitor the time intervals and to deactivate the I/O unit as a function of the monitoring.

10. The arrangement of claim 1, wherein the verification data comprise a serial number (V3) that represents a predefined sequence of the data messages.

11. The arrangement of claim 1, wherein the verification data comprise a checksum (V4), which essentially makes safe the specific verification data alone.

12. The arrangement of claim 1, wherein the data messages comprise a protocol part and a payload data part, with the protocol part being specified depending on the communication network and with the verification data being arranged in the payload data part.

13. The arrangement of claim 1, wherein the user program has a variable first program part and an invariant second program part, with the first program part determining the control commands depending on the input data, and with the second program part integrating the verification data into the data messages.

14. A disconnection unit for use in an arrangement for controlling an automated system having a programmable control unit for running a user program, having a remote I/O unit to which a number of sensors and actuators are connected, and having a communication network which connects the control unit and the remote I/O unit in order to transmit data messages comprising control commands from the control unit to the I/O unit, said I/O unit driving said actuators in response to the control commands, the disconnection unit comprising:

a data interface for receiving specific verification data from the control unit, said specific verification data being integrated into said data messages, a data processing part for processing said specific verification data separately from the input data and the control commands, and a disconnection part designed to prevent the I/O unit from driving the actuators as a function of the specific verification data.

15. The disconnection unit of claim 14, wherein the automated system is a railroad system.

16. A method for controlling an automated system which has sensors and actuators, the method comprising the steps of:

providing a remote I/O unit, to which a number of the sensors and actuators are connected, providing a control unit for processing input data from the sensors and for generating control commands for the actuators in response to the input data, providing a communication network which connects the control unit and the remote I/O unit, interchanging data messages between the control unit and the I/O unit via the communication network, with the data messages comprising at least one of the input data and the control commands, and providing a remote disconnection unit in the area of the I/O unit and coupling the remote disconnection unit to the remote I/O unit, wherein the control unit integrates specific verification data for the disconnection unit into the data messages for the I/O unit, and wherein the disconnection unit processes the specific verification data separately from the input data and the control commands and deactivates the I/O unit as a function of the specific verification data.

* * * * *